Patented June 5, 1945

2,377,674

UNITED STATES PATENT OFFICE 2,377,674

HYDRAULIC SHOCK ABSORBER SEALING MEANS

Harry L. Chisholm, Jr., Buffalo, N. Y., assignor to Houdaille-Hershey Corporation, Detroit, Mich., a corporation of Michigan Application March 31, 1943, Serial No. 481,222

2 Claims. (Cl. 309—22)

My invention relates to hydraulic shock absorbers or analogous hydraulic structures in which hydraulic fluid is subject to displacement under pressure and where it is desirable to prevent leakage between flat or curved engaging surfaces on operating parts of the structure. For example, in a hydraulic shock absorber of the rotary type, in which a vaned piston operates in a cylinder between abutments, it is desirable, in order to maintain efficient operation, to prevent leakage between the ends of the piston vanes and the cylinder wall engaged thereby, and also between the piston hub and the abutments engaged thereby. The important object of my invention is therefore to provide an improved sealing means for preventing leakage in structures of the type referred to.

The various features of my invention are embodied in the structure shown on the drawing, in which Figure 1 is a section of a hydraulic shock absorber of the rotary type, on plane I—I, Figure 2;

Figure 2 is a section on plane II—II of Figure 1;

Figure 3 is an enlarged partly sectional view, of one of the sealing elements;

Figure 4 is an end view of the sealing element;

Figure 5 is an enlarged sectional view of part of the shock absorber piston hub and one of the abutments, showing the sealing means applied;

Figure 6 is a view similar to Figure 5 showing a modified arrangement; and

Figure 7 is an enlarged sectional view showing the engagement of the end of a sealing element with a wall of the shock absorber.

The hydraulic device to which I have shown my improved sealing means applied is a shock absorber of the so-called rotary type. Briefly describing this shock absorber, it comprises the cylinder wall 10 extending from a base 11. Near its outer end the wall 10 has the internal shoulder 12 against which the closure wall 13 abuts, this wall having the diametrically opposite abutments 14 extending therefrom along the wall 10 into engagement with the base wall 11, keys 15 between the abutments and the wall 10 holding the abutments and the closure wall 13 against rotary movement.

The cylindrical hub 16 of the piston structure extends between the wall 13 and the base 11 and has the vanes 17 extending therefrom for engagement at their outer ends with the cylinder wall 11. The piston shaft 18 extends from the hub through the bearing flange 19 on the wall 13, and also through a clamping wall 20 which has threaded engagement in the outer end of the cylinder wall 10 for engagement with the closure wall 13 to hold it securely seated against the shoulder 12. The piston hub has the valve chamber 21 therein whose inner and outer ends are separated by suitable valving means shown in the form of a valve disk 22 having a restricted metering orifice 23 therethrough.

The piston hub and vane and the abutments divide the space within the cylinder wall 10 into hydraulic working chambers 24, 25 and 26, 27. The working chambers 25 are connected with the inner end of the valve chamber through passageways 28 through the piston hub, and the working chambers 26 and 27 are connected with the lower end of the valve chamber through the passageways 29, so that during oscillation of the piston structure the hydraulic fluid is displaced under pressure to flow from one set of hydraulic chambers to the other set through the restricted orifice 23, so that the operation of the piston, and the structure controlled thereby, is damped, all in a manner well understood in the art.

Unless proper sealing means are provided, the high pressure generated during oscillation of the piston structure will cause leakage flow from the high pressure working chambers to the low pressure working chambers through the space between the piston hub and the abutments, and through the space between the ends of the vanes and the cylinder wall, such leakage materially decreasing the efficiency of the shock absorber. To prevent such leakage I have provided a successful and practical sealing arrangement involving sealing elements or units located in grooves in the ends of the abutments for engagement with the piston hub, and in grooves in the ends of the vanes for engagement with the cylinder wall.

The sealing element is composed of a tubular body or sleeve 30 and a core 31. The body is of resilient elastic material such as natural rubber or oil resisting synthetic rubber and is intimately bonded to the core by being molded therearound or by being vulcanized thereto. The core may be of metal such as brass or brass plated steel so that the body may be more intimately vulcanized or bonded thereto, or the core could be of nonmetallic material such as hard rubber so that the core may be axially rigid but laterally somewhat flexible. The intimate bonding of the body to the core will prevent relative axial slippage or displacement.

To receive the sealing units, each abutment 14 has at its inner end a groove or channel 32, and at the end of each vane there is a channel 33, these

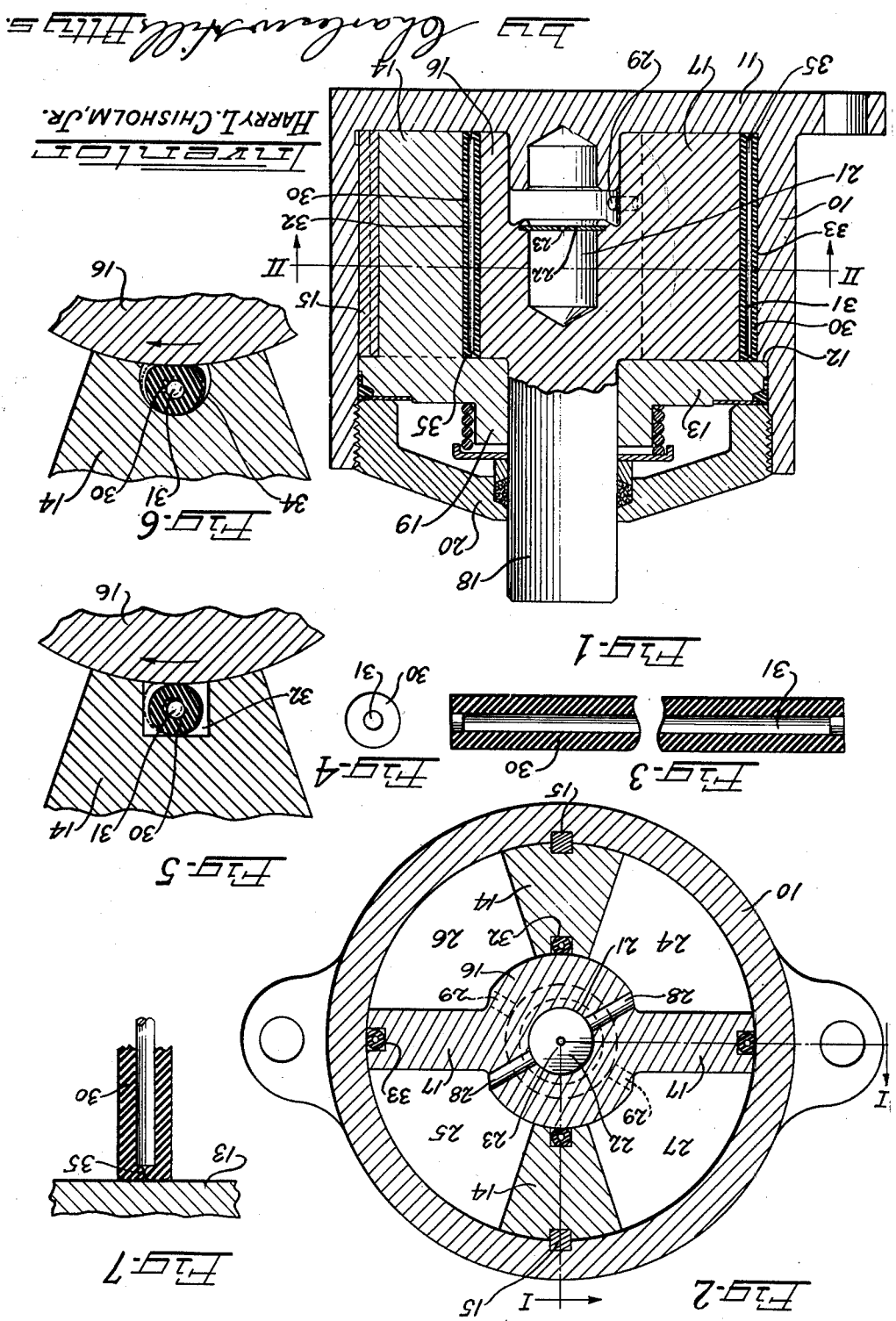
June 5, 1945.   H. L. CHISHOLM, JR   2,377,674
HYDRAULIC SHOCK ABSORBER SEALING MEANS
Filed March 31, 1943